May 19, 1970     H. WEINBAUM     3,512,399
ULTRASONIC INSPECTION AND FAIL-SAFE INDICATION
METHOD AND APPARATUS

Filed Feb. 27, 1967     3 Sheets-Sheet 1

Hillel Weinbaum
INVENTOR

BY
Arnold, Roylance, Kruger & Durkee
ATTORNEYS

Hillel Weinbaum
INVENTOR

BY
Arnold, Roylance, Kruger & Durkee
ATTORNEYS

3,512,399
ULTRASONIC INSPECTION AND FAIL-SAFE INDICATION METHOD AND APPARATUS

Hillel Weinbaum, Houston, Tex., assignor to American Machine & Foundry Company, New York, N.Y., a corporation of New Jersey
Filed Feb. 27, 1967, Ser. No. 618,827
Int. Cl. G01n 23/20
U.S. Cl. 73—67.5                                11 Claims

ABSTRACT OF THE DISCLOSURE

The present invention pertains to a method and apparatus for ultrasonically inspecting a region within an article using two transceiving transducers positioned on the surface of the article and located at different distances from the inspected region. The transducers are simultaneously energized, resulting in a response at each transducer of a signal corresponding to the transmission from the other, together with reflections from its own transmission from any anomalies within the region. A composite display of the responses provides identification of anomalies and locates them with respect to the center point between the transducers. Also, the received signals may be used to appropriately activate logic gates for operating fail-safe switching and indicating means as determined by the operating conditions of the transducers and other equipment.

BACKGROUND OF THE INVENTION

Field of the invention

This invention relates to the ultrasonic inspection of articles for defects and more specifically to locating even very small flaws and other anomalies ultrasonically in such a manner that equipment failures are immediately identified.

Description of the prior art

Ultrasonic inspection techniques using schemes employing a single transducer operating as a transceiver and schemes employing two transducers, one operating as a transmitter and the other operating as a receiver, have long been used to inspect articles for flaws and defects. Typically, in the single transceiving transducer arrangement, the transducer is appropriately coupled to the surface of the article so that the energy radiating therefrom is directed generally toward the region within the article to be inspected. The transducer is then energized by an appropriate energizing circuit including a suitable ultrasonic acoustical source. When there are no anomalies within the inspected region of the article, the only reflections received by the transducer will be those of the surface boundaries (provided that the transducer is positionally oriented so that the boundary surfaces will reflect energy back to the transducer).

However, when there are anomalies within the inspected region of the article capable of reflecting ultrasonic acoustical energy, the transceiving transducer receives the reflections therefrom. Since the energy travels within any given article at a predetermined speed, the time between the initiation of the energy (or alternately, the time of the receipt of a known boundary surface reflection) and the receiving of reflections is a measure of distance from the source to the anomaly.

When it is desired to isolate the energizing or transmit circuit from the receive circuit, or when it is desirable to transmit from one surface of an article and receive from the opposite surface of the article, a two transducer arrangement may be used, one connected in each circuit.

In addition to the various transducer arrangements discussed above, various logic components have been used in connection therewith. For instance, gates and other components have been used to isolate segments of time for display purposes. For instance, following the reference indication (for example, the creation occurrence of the inspection energy by the source), it is known that if a flaw or other anomaly exists in an inspected region there will occur in a predeterminable time period later a received reflection therefrom. That is, if there is an anomaly in a region, the reflection therefrom occurs during a known time period following the reference occurrence. Therefore, the receive circuit may be gated on or enabled during that time period, thereby eliminating the receive circuit from receiving spurious responses, large initial source signals, the front surface and back surface reflections, and any other unmeaningful signals which are desirably omitted.

Although these prior art structures have proved satisfactory in discovering and locating flaws, equipment malfunctions are often not detectable and result in either false indications of anomalies or anomalies being overlooked. When it has heretofore been desirable to include an indication of satisfactory equipment operation, it has been necessary to include circuit components in an auxiliary circuit separate and apart from the inspection circuit. The transducer arrangements and the logic circuits, although in many instances complex, have not been so arranged to provide inspection indications and equipment fail-safe indications at the same time.

SUMMARY OF THE INVENTION

The present invention not only provides an improved manner of locating anomalies in an environment of minimum noise and maximum signal, but also provides an indication of satisfactory equipment operation. It should be noted that both functions are accomplished by the same integrally operating components. Since this is true, inspection and fail-safe indications are achieved in a more simplified fashion and with a fewer number of elements than has been possible by prior art schemes.

Generally, described is an embodiment of equipment prearranged for practicing the invention in conjunction with a tubular article having a longitudinal weld. The illustrated equipment comprises two transceiving transducers located in a common transverse plane of the article and coupled to the outside surface thereof so that energy from each is directed to the other through the weld region. Also, one transceiver is spaced from the weld at a distance different from the distance between the weld and the other transceiver.

A common ultrasonic source is connected to energize both transceivers simultaneously, resulting in a receipt of energy at each transceiver from the other at the same time. Also received at each transceiver are reflections from its own transmission off any anomalies that might be present in the path between the transceiver locations.

If there is an anomaly, it may be seen that a common receiving and indicating circuit connected to the transceivers successively detects and displays the energizing signal, the anomaly reflected signal to the transceiver located nearest the anomaly (when one exists), the simultaneously received energy transmitted from the opposite transceivers, and the anomaly reflected signal to the transceiver located furtherest from the anomaly (if any).

By maintaining the physical relationship of the transceivers constant with respect to the weld and by gating the received circuits to operate only at times when there could be a received reflection from the region of the weld, indication and location of the anomaly is made positive.

At the same time, the constantly appearing received energy from the opposite transceivers provide an indication of satisfactory equipment operation.

In addition, if desired, the source signal and the simultaneously received energy from the opposite transceivers may be used to operate a separate fail-safe indicator. Of course, absence of the receipt of the signals from the opposite transceivers may be used to shut off the equipment, as well.

Also if desired, in a refined equipment alignment arrangement, it is possible to use energy introduced by the two transducers to illuminate separate portions of the thickness of the weld region. A reflection of energy introduced by a known one of the transducers indicates that there is an anomaly in the region illuminated by the energy from that transducer.

Further, by sequentially operating first one transducer, then the other transducer, and then both, first one portion of the weld region is inspected, then the other portion, then the equipment is verified.

BRIEF DESCRIPTION OF THE DRAWINGS

So that the manner in which the above-recited advantages and objects of the invention, as well as others which will become apparent, are attained can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and therefore are not to be considered limiting of its scope for the invention may admit to other equally effective embodiments.

In the drawings.

DESCRIPTION OF THE PREFERRED EMBODIMENT

In considering the invention, the discussion first pertains to the location of the transceiving transducers with respect to a region within an article to be inspected and the effect the physical placements of the inspection transducers with respect to that region have on the time relationship of the resulting energy introduced and received by these transducers. Subsequently, the discussion considers an electrical circuit which may be used with the transducers to make a complete inspection and fail-safe apparatus.

Figure 1:
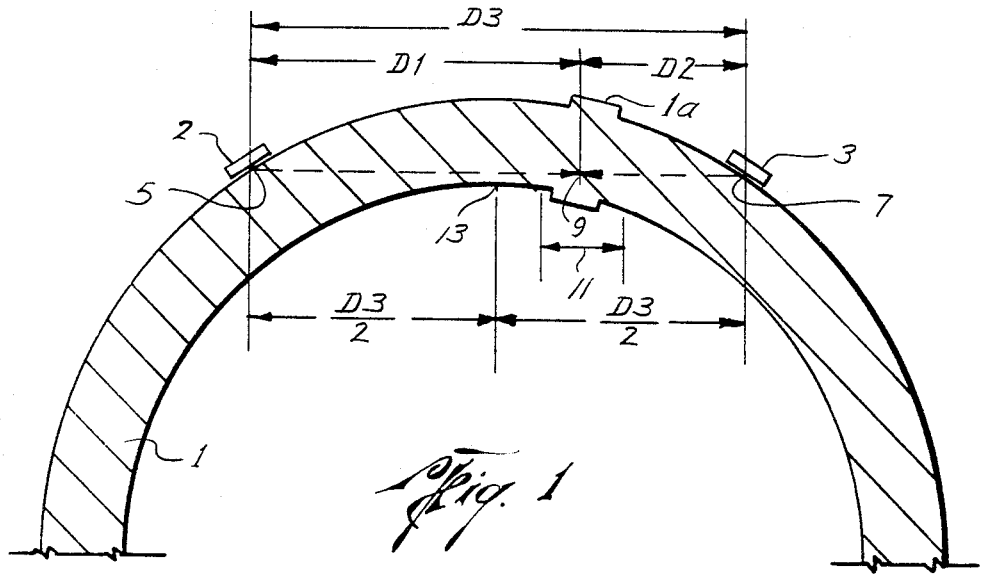
FIG. 1 is a cross-sectional view of an article being inspected in accordance with an embodiment of the present invention.
Figure 2:
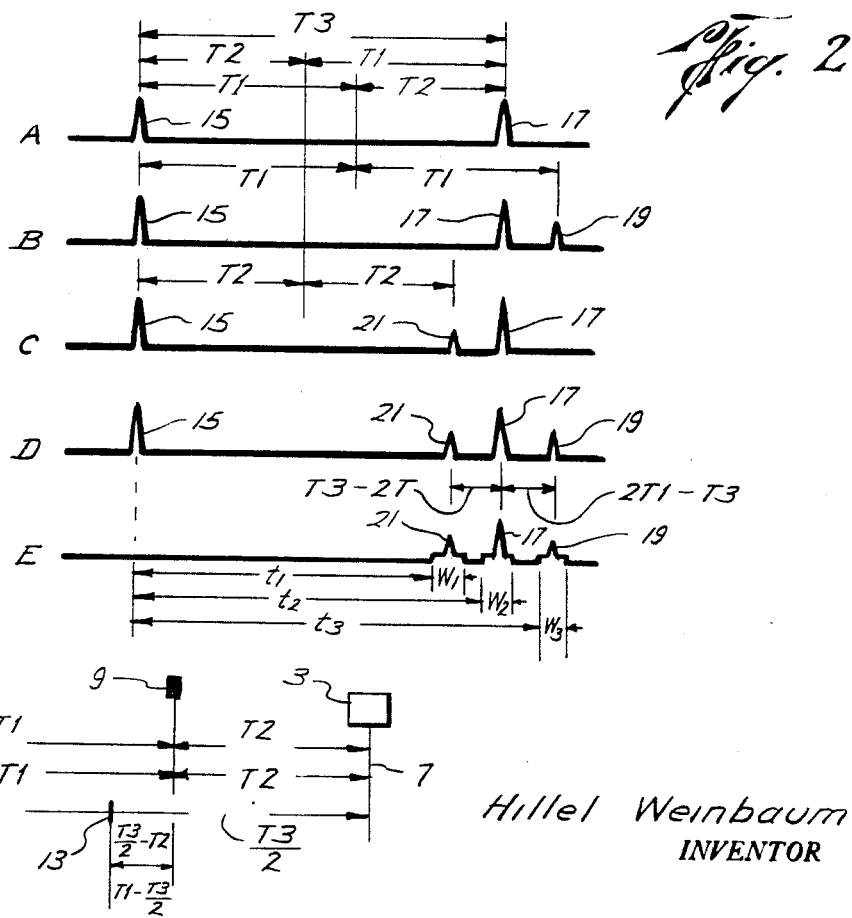
FIG. 2 is a time diagram shcwing the development and relative occurence of the various existing signals that occur in the operation of the illustrated embodiment.
Figure 3:
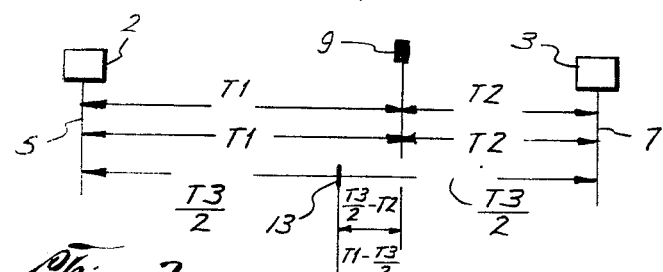
FIG. 3 is a plan view of the illustrated embodiment showing the relative travel time relationships of the produced signals.

Referring now to FIGS. 1, 2 and 3, and first to FIG. 1, a cross-sectional view of a pipe 1 to be inspected is shown having therealong a welded region 1a, shown by the slight upset the weld causes at the inside and outside surfaces of the pipe. Transceiving transducers 2 and 3 are coupled to pipe 1 by any convenient means (not shown) such that transducer 2 is located at a straight line distance D1 from the center of the welded region, and peripherally located on the opposite side of welded region 1a, transducer 3 is located at the straight line distance D2 from the center of the welded region. Also, at any instant of time, transducers 2 and 3 are located in the same transverse plane of pipe 1.

Transducers 2 and 3 are both appropriately shaped, shielded, tilted or otherwise treated at their respective locations such that energy directed from transducer 2 is received by transducer 3 after passing through the cross-sectional area of welded region 1a to be inspected and energy directed from transducer 3 is received by transducer 2 after passing through the same welded region. Finally, for convenience of discussion, distance D1 is made greater than distance D2.

A flaw 9 (representaive of a suitable anomaly capable of reflecting ultrasonic energy) is shown within the region of the weld to be inspected and in the common path between transducers 2 and 3, along which energy passes in both directions as above described. As is later described in more detail, the timing operation of the inspection apparatus is such that only anomalies within a region 11 of the article are detected. Region 11 is made slightly larger than the width of welded region 1a, and encompasses region 1a so as to ensure that anomalies within region 1a are not overlooked.

To understand the relationship of the received energy at transducers 2 and 3, in FIG. 2A is illustrated the pulse of energy that are received at transducer 2 provided that there is no anomaly along the common path between transducers 2 and 3 within region 11. (Similarly, FIG. 2A illustrates the pulses of energy at transducer 3.) If it is first assumed that the received energy as it appears at transducer 2 is illustrated, pulse 15 is that energy reflected off the surface of member 1 at point 5 located at the point energy is introduced from transducer 2 into pipe 1. Pulse 17 is that energy received at transducer 2 following the simultaneous introduction of energy by transducer 3 following its traversing the common path between the transducers. Entire distance D3 between transducers 2 and 3 takes a time T3 to traverse. Therefore, the distance between pulses 15 and 17 may be thought of as separated by time T3.

If it is assumed that FIG. 2A illustrates the received energy at transducer 3, initial pulse 15 is that energy which is reflected off near-surface point 7 underneath transducer 3 (point of entry for the introduction of energy from transducer 3). Pulse 17 represents the energy initiated at transducer 2 after it traverses distance D3 and is received at transducer 3. Since the distance D3 is traversed just as quickly in one direction as in the other (a time T3) it may be seen that FIG. 2A actually illustrates the condition at either transducer 2 or 3, or a superposition of both.

Now assume that a flaw 9 or ultrasonic energy reflecting anomaly exists at a distance D1 from transducer 2 and at a distance D2 from transducer 3. In such event, the energy introduced by transducer 3 travels a distance D2 from point 7 to flaw 9 taking a time T2. Some of the energy continues through the flaw in the same direction taking an additional time T1 to travel distance D1 to transducer 2. Likewise, the energy traveling from transducer 2 to transducer 3 takes a time T1 to travel the distance D1 and then a time T2 to travel the distance D2. Hence, at both transducers 2 and 3 a pulse 17 will result as before, even though there are return reflections from flaw 9 in addition.

Now turning to FIG. 2B, the received energy at transducer 2 is shown. As with FIG. 2A, pulses 15 and 17 are still received. In addition, a pulse 19 is received after a time lapse for energy to travel (in time) from transducer 2 to flaw 9 and back to transducer 2. Since two times T1 is longer than T3, pulse 19 occurs in time after pulse 17.

In FIG. 2C the energy received at transducer 3 is shown when a flaw 9 exists. Again, pulses 15 and 17 appear in their same relationship as previously described. In addition, energy traveling from transducer 3 to flaw 9 and back to transducer 3 takes a period of time equal to two times T2, resulting in a pulse 21. Since two times T2 is shorter than T3, pulse 21 occurs in time before pulse 17.

FIG. 2D shows the composite energy received at transducers 2 and 3 in the presence of a flaw 9. In sequence, pulses 15, 21, 17 and 19 are shown. Further, it may be observed that the distance between pulse 17 and 21 is equal to T3 minus two times T2 and the distance between 19 and 17 is equal to two times T1 minus T3.

Actually, as will be explained later, the actual display of signals will be more like that shown in FIG. 2E, where pulses 17, 19 and 21 are shown as in FIG. 2D, with the exception that initial pulse 15 is removed and small gates $W_1$, $W_2$ and $W_3$ are also shown during the time that pulses 17, 19 and 21 may respectively occur.

Now turning to FIG. 3, a plan view is shown illustrating the actual travel time of an ultrasonic energy pulse from transducers 2 and 3 to each other and to a flaw 9. In terms of the times discussed above for FIGS. 1 and 2, it may be seen that the travel time from transducer 2 to flaw 9 is T1 and that the travel time from transducer 3 to flaw 9 is T2, the respective starting and return points for transducers 2 and 3 being points 5 and 7, respectively.

Since the total time between points 5 and 7 is T3, the point 13 that is the middle distance between points 5 and 7 is selected such that the travel time between points 5 and 13 is $T3/2$ and the travel time between points 7 and 13 is $T3/2$. Since flaw 9 is located at a point off-center purposely and in the example of the presented embodiment nearer point 7 than point 5, the time between points 9 and 13 may be expressed either of two ways, namely, $$\frac{T3}{2} - T2 \text{ or } T1 - \frac{T3}{2}$$

Referring now to FIG. 2D and comparing the time relationships there expressed for pulses 17, 19 and 21 with the time relationships developed for points 9 and 13 in FIG. 3, it may be seen that the relationships differ only by a constant value. Also, it should be noted that functionally, pulse 17 marks the effective center point between anomaly response pulses 19 and 21. Therefore, the spacings of the pulses in FIG. 2D are directly functionally related to the position that flaw 9 has with respect to the center position between transducers 2 and 3.

Figure 4:
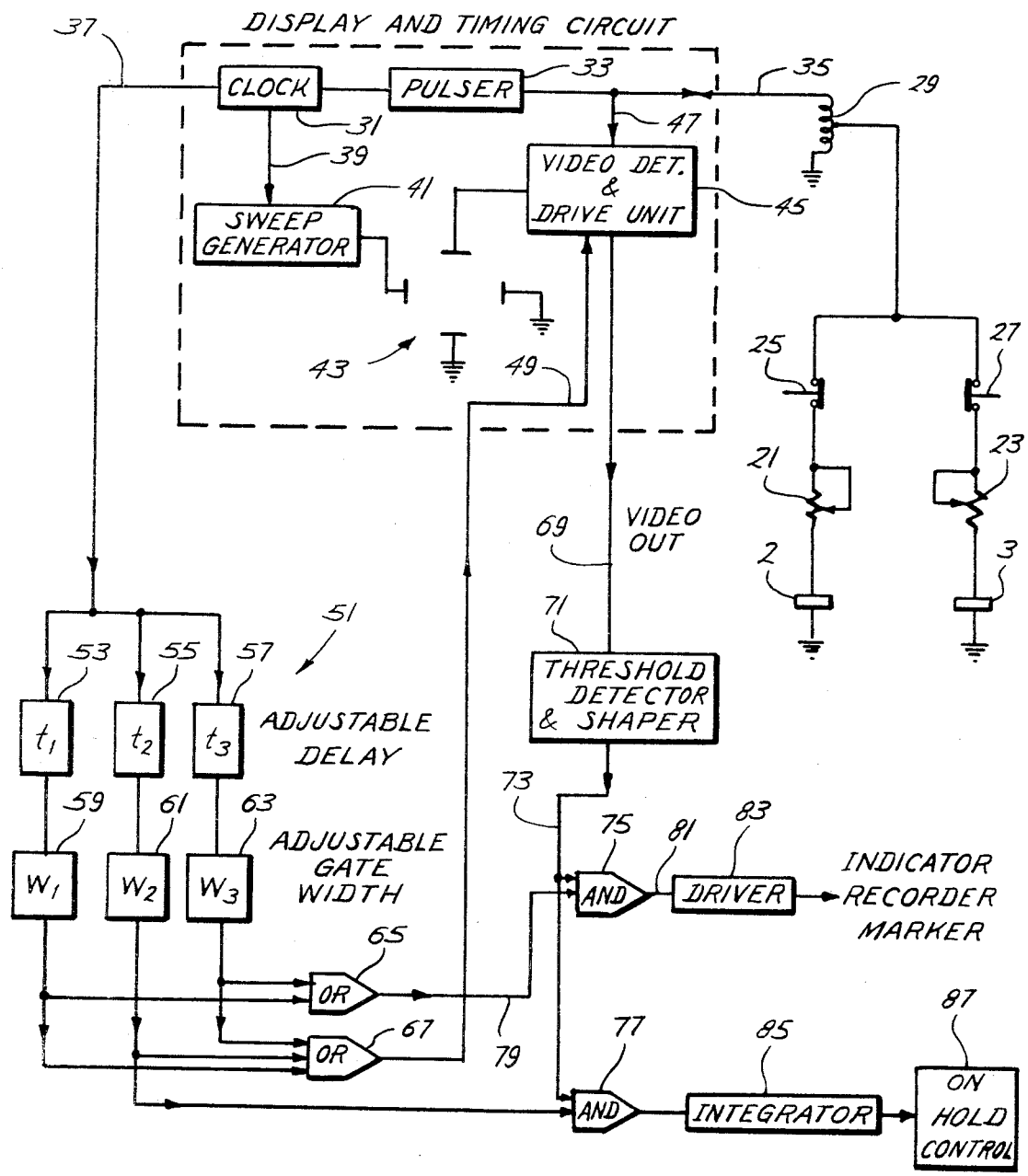
FIG. 4 is a block diagram of an illustrated electrical apparatus which forms a part of the illustrated invention.

Now referring to the block diagram of the illustrated electrical circuit shown in FIG. 4, transducers 2 and 3, physically positioned in accordance with the above description, are connected together through variable resistors 21 and 23 and disconnect switches 25 and 27, respectively, to a common connection. This common connection of the transducer circuits is then connected to a matching transformer 29. As will be explained later, resistors 21 and 23 may be termed sensitivity resistors to compensate for imbalance in the sensitively between transducers 2 and 3.

Now turning to the display and timing circuit, an energy pulse source in the form of a combination clock 31 and pulser 33 is shown, the clock triggering the pulser. The clock establishes the basic timing sequency for operation of the entire apparatus. The pulser, excited by a signal from the clock, produces sufficiently high energy pulses at convenient intervals for energizing transducers 2 and 3 via line 35 connected to transformer 29.

Clock 31 may conveniently take the form of an astable multivibrator producing short-term pulses at regular intervals, normally on the order of a few milliseconds apart. Pulser 33 may conveniently take the form of a high energy circuit including a silicon controlled rectifier (SCR). Such a device represents an open circuit until an appropriate gate signal from clock 31 is applied to the gate terminal thereof. Upon such gate signal receipt, the SCR switches substantially instantaneously to the conducting state to produce an appropriate energizing pulse to the transceiving transducers. Therefore, the output on line 35 from pulser 33 is a series of pulses coincident in time with the pulses from clock 31, but at much higher levels.

The other outputs (other than the output triggering pulser 33) are taken from clock 31, namely, output 37 to delay and gate circuits 51 (described below) and output 39 to sweep generator circuit 41 connected to one orthogonal control element of a display unit 43. Connected to the opposite orthogonal control element of 43 is a video detector and drive unit 45. Since the signals from unit 45 are generally the detected response signals developed in conjunction with a single clock output pulse, the synchronized operation of sweep generator 41 provides a display cycle for display unit 43 so that the responses resulting from each source pulse occurrence may be viewed.

The inputs to video detector and drive unit 45 are received via line 47 from matching transformer 29 and via line 49 from delay and gate circuits 51 to be described. More specifically, line 47 is connected to line 35 from transformer 29 and receives the return response pulses from transceiving transducers 2 and 3 following detection as described above.

The video detector and drive unit 45 may conveniently take the form of a video amplifier responsive to the frequency of the received responses on line 47, as enabled by an appropriate biasing voltage that exists at appropriate times on line 49.

The delay and gate circuits 51 comprise three adjustable delay circuits 53, 55 and 57; three adjustable gate width circuits 59, 61 and 63; and two OR circuits 65 and 67.

Adjustable delay circuits 53, 55 and 57 each receives its input via line 37 from clock 31 and produces an output after an adjustable period of time. Each of the three circuits is of similar construction, but the adjustable periods of time are set so that, in sequence, the pulses from circuits 53, 55 and 57 occur sequentially in that order.

Adjustable gate width circuits 59, 61 and 63 are controlled effectively by the inputs received respectively from adjustable delay circuits 53, 55 and 57. Each of these circuits is similarly constructed and provides an output for an adjustable duration, after which it resets until another input is received. Since the starting times of these three circuits are in sequential order, the adjustable gate width circuits provide their outputs in the same sequence, although the period of time or duration that each produces an output is independently adjustable from the others.

Adjustable delay circuits 53, 55 and 57 each may conveniently take the form of a counter that produces an output after the end of a selectable count, the count determining the time delay desired. Adjusable gate width circuits 59, 61 and 63 each may conveniently take the form of monostable multivibrators, the recovery time for which is controllable by adjustable components therein.

OR circuits 65 and 67 of conventional design are connected to the outputs of 59, 61 and 63 such that OR circuit 65 is connected to the output of 59 and 63 and OR circuit 67 is connected to the output of all three gate width circuits 59, 61 and 63. The output on line 49 from OR circuit 67 is applied to unit 45 as an enabling signal. That is, only when there is an output on line 49 (during the occurrence of one of the gate signals) will the received response signal on line 47 be applied to display unit 43.

In addition to the output from drive unit 45 to display unit 43, an output is also applied on line 69 to threshold detector and shaper unit 71. The detector and shaper unit 71. The detector and shaper unit is triggered only when the video output signal on line 69 is of a magnitude to indicate that a pulse of sufficiently meaningful height has been detected by one or both of the transducers. The shaper provides an output on line 73 suitable for operating AND circuits 75 and 77 (in conjunction with the application of other logic signals).

Threshold detector and shaper circuit 71 may conveniently take the form of a Schmitt trigger and monostable multivibrator combination, the Schmitt trigger triggering on the predetermined threshold level and the monostable multivibrator producing a square wave output when triggered by the Schmitt trigger suitable for activating the subsequent logic gates 75 and 77.

AND circuit 75 receives as its input the signal on line 73 from threshold detector and shaper unit 71 and the signal on line 79 from gate 65 so that when both inputs are present simultaneously it produces an output 81 to a driver circuit 83. Both inputs are present when there is a received return pulse from at least one of the transducers and when there is a gate signal during the possible time of an anomaly within the inspected region. This means that driver 83 is triggered at the time of an anomaly; therefore, the output of the driver circuit may be connected to an indicator such as a light, a recording mechanism, a marking circuit (such as would put a mark on the inspected article), or any other suitable apparatus.

AND circuit 77 receives as its input the signal on line 73 and the output signal from gate 61. Both inputs are applied to the circuit when there is a positive response by at least one of the two transducers to the energy introduced into the inspected article by the opopsite transducer (an indication that the transducers are operating properly). The output from gate 61 indicates that the clock and adjustable delay circuit 55 and adjustable gate width circuit 61 are also operating properly. Therefore, the output from AND circuit 77 occurs for each output of a pulse from clock 31, regardless of the presence of anomalies within the inspected region of the article. This output may be applied to an appropriate integrator circuit 85, which, in turn, may then be applied to an on-holding control 87.

Integrator 85 includes components having time constant values of sufficient duration that an output is produced therefrom as long as it receives an applied voltage during each cycle of clock 31. On-holding control circuit 87 may conveniently include a switching relay connected to the input power connection of the overall circuit. In such event, when there is a failure to operate properly (loss of output from integrator 85), the circuit will be switched off, until manually reset (not shown) upon restoration of proper operating conditions.

Now turning to the timing operation of the circuit, it will be seen that upon the initiation of an energy pulse from clock 31 both transducers 2 and 3 transmit energy simultaneously into the surface of the article to be inspected. Because of the physical relationship of the transducers, energy from each transducer 2 and 3 is directed toward the other through the inspected region. To ensure that the energy introduced by transducers 2 and 3 is of equal magnitude, variable resistors 21 and 23 may be adjusted to compensate for any differences in the transducer characteristics.

Upon receipt of a response at transducer 2 or 3, as described above, which may be in the form of a reflection from an anomaly within an inspected region or the energy from the other transducer, a signal is applied through matching transformer 29 to video detector 45.

In the meantime, clock 31 applies a signal 37 to adjustable delay circuits 53, 55 and 57, which in turn and in sequence at times $t_1$, $t_2$ and $t_3$ (FIG. 2E) activate adjustable gate width circuits 59, 61 and 63. During each of the gate times selected by the adjustable gate width circuits a signal is developed on line 49 which enables video detector and drive unit 45. When there is received response on line 47 during any of these three times a signal appears on the output of unit 45, which is connected to display unit 43. Since the output of clock 31 on line 39 activates sweep generator 41, on each cycle of clock 31 the output signals from drive unit 45 related to that clock cycle are shown on display unit 43.

It is also true that drive unit 45 may produce an output signal corresponding to the gate signals produced on line 49, regardless of the presence of a received response on line 47. This means that the display unit shows the gates ($W_1$, $W_2$ and $W_3$ in FIG. 2E) on each cycle of the clock regardless of the presence of anomalies. When there is an anomaly present during a gate time, then the display superimposes the gate signal and the received response signal.

Adjustable delay circuit 53 and related adjustable gate width circuit 59 are set so that the gate occurrence produced thereby is established during the time which anomaly responses from within the inspected region may be detected by transducer 3 (the transducer which is located nearest the inspected region). Similarly, adjustable delay circuit 57 and related adjustable gate width circuit 63 are set so that the gate occurrence produced thereby is established during the time which anomaly responses from within the inspected region may be detected by transducer 2 (the transducer which is located furthest from the inspected region). Finally, adjustable delay circuit 55 and related adjustable gate width circuit 61 are set so that the gate occurrence is established during the time of simultaneous receipt by each transducer 2 and 3 of a pulse initiated by the opposite transducer.

It may be seen that such adjustment of the gates makes it possible for the display unit to present a display as shown in FIG. 2E (including the exclusion of initial pulse 15). Actually, since the anomaly is located with respect to the midpoint between the transducers (represented by pulse 17), the initial pulse 15 is not necessary for accurate location of the anomaly within the region.

Circuits 71, 75, 83, 77, 85 and 87 provide signals to auxiliary circuits as described above when appropriate received responses and gate signals are present.

It may be seen that to provide continuous inspection of a region, such as the welded region $1a$ shown in FIG. 1, transducers 2 and 3 may be connected to an appropriate relative translating and drive means (not shown) so that the transducers can be moved longitudinally with respect to pipe 1, maintaining distance D1 and D2 constant.

Also, pulse 17 need not be displayed since it is known that 19 and 21 represent the respective anomaly responses to transducers 2 and 3. Therefore, by merely dividing the distance between pulses 19 and 21 by two, the detected anomaly is accurately and positively located with respect to the physical center on the pipe between the transducers.

Alternatively, pulse 17 and either pulse 19 or 21 only may be selected for display. Since the identification of the pulses is predetermined, the direction from the center point is known. The distance between the pulses displayed is functionally related to the distance between the center point between the transducers and the anomaly as above described.

In the above discussion, the inspected article has been assumed to be pipe 1, or a curvilinear article. Actually, as the paths from the transceiving transducers through the article may be flat or any other configuration so long as the paths from the transceiving transducer through the region being inspected can be established collinear.

Also, the paths from and to the transducers should not be thought of as without dimension, since in truth, the paths represent the actual ray-like emanations that result upon excitation of a transducer by the source.

Moreover, the paths themselves may include one or more surface boundary reflections through the region. Since these reflections appear constant so long as the transducers are maintained fixed with respect to the inspected region, such boundary reflections are readily identifiable upon displaying. In fact, such unwanted responses may be eliminated from the display altogether, provided they fall outside of the established gates.

Further, the energy source has been referred to as having a clock or repetitive pulse-like characteristic. It is apparent that a source that can be triggered manually to produce a pulse one at a time may be used, if desired.

Figure 5:
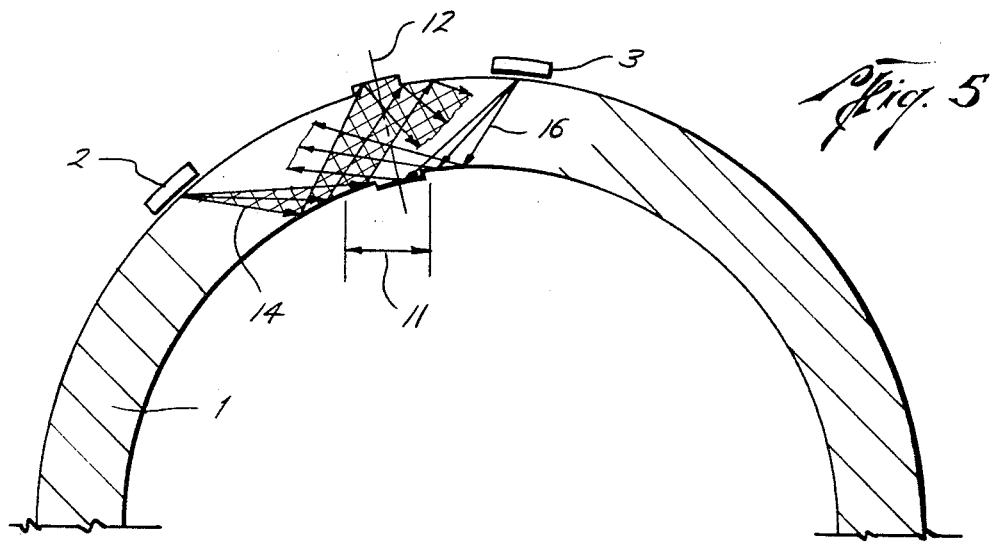
FIG. 5 is a cross-sectional view of an article being inspected in accordance with an embodiment of the present invention in a refined operating mode.

Now turning to FIG. 5, a refined usage of transducer placements with respect to the inspected region 11 of article 1 is illustrated. Radial center line 12 is shown perpendicular to the tangential plane of the surfaces of article 1 where it is drawn.

As noted above, the energy introduced into article 1 by the transducers have ray-like dimensions, such as wave 14 from transducer 2 and wave 16 from transducer 3. By placing the transducers properly with respect to region 11 to be inspected, it is possible to have the wave front of wave 14 pass substantially through one portion of the thickness of article 1 in the vicinity of center line 12 and to have the wave front of wave 16 pass substantially through the other portion of the thickness of article 1 in the vicinity of center line 12. Although FIG. 5 shows each wave passing through its respective portion after only a single boundary surface reflection, many reflections may occur before the waves actually pass through the inspected region.

Recalling that FIG. 2B shows the received energy at transducer 2 (the transducer furthest from the inspected region) when transducer 3 is not acting as a receiver, it is known that pulse 19 occurs as a result of energy being transmitted from transducer 2, being reflected from a flaw and being returned to transducer 2. Similarly, FIG. 2C represents the energy at transducer 3 when transducer 2 is not acting as a receiver, a pulse 21 occurring when there is a flaw in the region off which energy from transducer 3 is reflected and returns to transducer 3.

When the FIG. 5 alignment of the transducers is employed, then it is known that a flaw exists in the outer portion (near the outside surface) of the inspected region of the article when pulse 19 occurs. On the other hand, it is known that a flaw exists in the inner portion (near the inside surface) of the inspected region when pulse 21 occurs. Finally, if both pulses 19 and 21 occur, then there is a flaw in the inspected region extending across both the outer and inner portions.

In operating the associated electrical equipment to accomplish the above described sequence of inspecting steps, a convenient operating mode involving time sharing may be used. For example, during the first timing cycle of the clock, transducer 2 may be operated to transmit and receive and transducer 3 is cut off, a pulse 19 occurring in case of a detectable flaw. During the second timing cycle of the clock, transducer 3 may be operated to transmit and receive and transducer 2 is cut off, a pulse 21 occurring in case of a detectable flaw. Finally, during the third timing cycle, both transducers may be operated simultaneously to verify satisfactory operation of both transducers and the associated electronic equipment, as described above.

Figure 6:
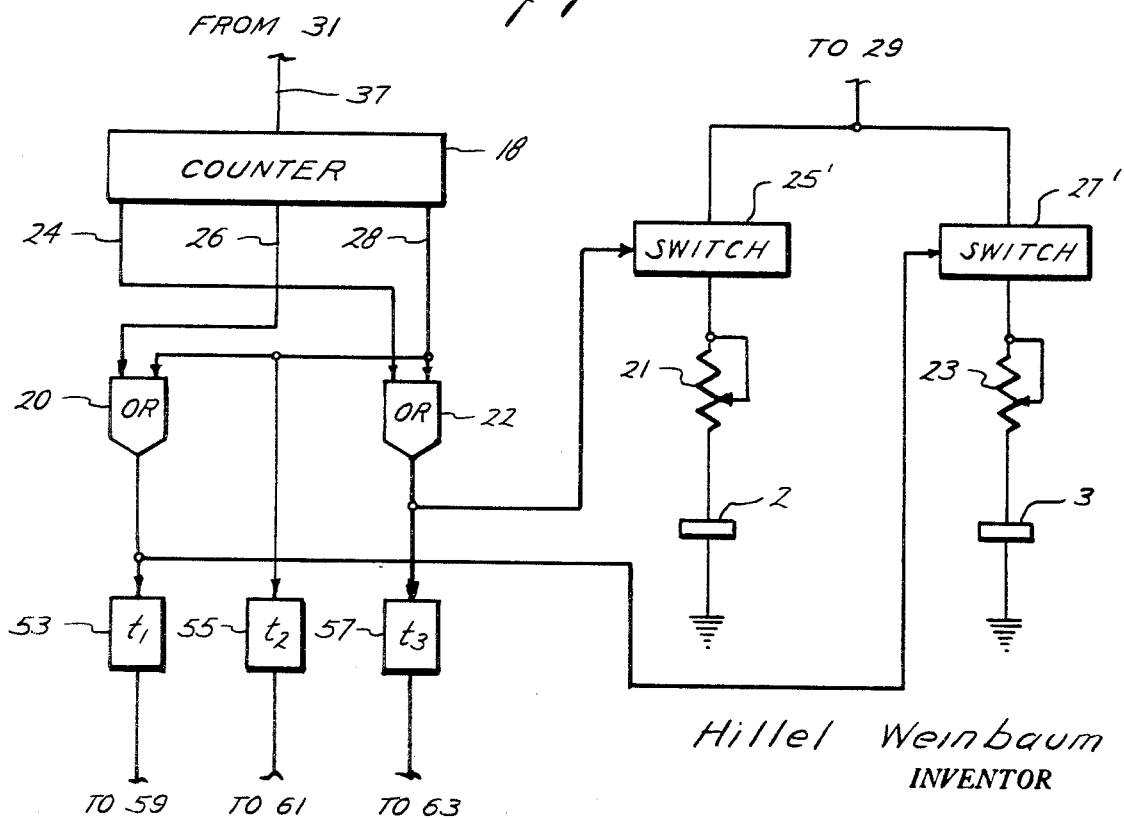
FIG. 6 is a partial block diagram of an illustrated electrical apparatus for operating the embodiment shown in FIG. 5, in a refined operating mode.

A circuit modification of the FIG. 4 circuit capable of operating in accordance with the above mode is shown in FIG. 6. A pulse rate divider in the form of a counter 18 and OR circuits 20 and 22 are inserted in line 37 from clock 31 to operate adjustable delay circuits 53, 55 and 57. Assuming that counter 18 provides outputs sequentially on lines 24, 26 and 28, OR circuit 20 is connected to second output 26 and third output 28, and OR circuit 22 is connected to first output 24 and third output 28. The output from OR circuit 20 is connected to delay circuit 53, the output from OR circuit 22 is connected to delay circuit 57, and output 28 is connected to delay circuit 55. Hence, adjustable delay circuit 57 is operated on the first and third pulses from the counter; adjustable delay circuit 53 is operated on the second and third pulses from the counter; and adjustable delay circuit 55 is operated on only the third pulse from the counter. The fourth pulse begins the cycle again.

The result is that a viewable gate (or gates) is (are) provided in order to display drive unit 45 only when there may be a pulse 19, a pulse 21, and pulses 17, 19 and 21.

To operate with this sequential mode of operation, switches 25 and 27 in FIG. 4 are replaced by electronic switches 25' and 27', which may be conveniently solid-state in nature. Enabling signals for switches 25' and 27' are taken respectively from the outputs of OR circuits 22 and 20. Hence, it may be seen that the operating cycle of transducer 2 is complementary with the related gate for viewing pulse 19, that the operating cycle of transducer 3 is complementary with the related gate for viewing pulse 21, and that both transducers operate complementary with the related gates for viewing pulses 21, 17 and 19.

Alternately, the third cycle of operation could provide for only operating complementary with the gate for viewing pulse 17 (which is the important pulse for verifying equipment operation).

Also, since there is an output only one-third as often from adjustable gate width circuit 61 applied to AND circuit 77 as for the original operation, the parameters of the components for integrator 85 are modified so that on-hold control circuit 87 operates only after there is a loss of signal from 61 on consecutive operating cycles thereof at its new longer operating occurrence.

All other operating conditioins for the operation of the circuit shown in FIG. 4 are the same for FIG. 6.

While several embodiments of the invention have been described, it is obvious that various substitutions or modifications of structure may be made without varying from the scope of the invention.

What is claimed is:

1. Ultrasonic inspection apparatus for determining the existence of anomalies in an inspected region of an article, comprising:
    a first transceiving transducer coupled at a first point to the surface of the article to direct ultrasonic energy into the inspected region, said first transducer being spaced from the region along a first path by a first predetermined distance,
    a second transceiving transducer coupled to the surface of the article to direct ultrasonic energy into the inspected region, said second transducer being spaced from the region on the opposite side thereof from said first transducer along a second path by a second predetermined distance different from said first distance,
    each transducer being positioned relative to the other transducer and relative to the inspection region to receive ultrasonic energy introduced by the other transducer,
    energizing means connected to said first and second transducers for energizing the respective transducers,
    means for pulsing said energizing means whereby said transducers produce pulses of ultarsonic energy,
    displaying means connected to said first and second transducers for providing a display indicating ultrasonic energy received at the second point after being introduced at the first point, energy received at the first point after being introduced at the second point, energy received at the first point following reflection from anomalies within the region, and energy received at the second point following reflections from anomalies within the region, the indications of reflected energy received at the first and second points being displayed in the same composite display,
    gate means connected to said displaying means to provide an indication of the energy received at said first and second points only during the times that reflections of energy pulses from anomalies within the region can occur at the respective points and during the time of receipt by said transducers of pulses of energy introduced by the opposite transducer.

2. The method of identifying the existence of an anomaly capable of reflecting ultrasonic energy within an inspected region of an article, the article having two surfaces separated by the thickness of the article, which comprises the steps of:

introducing ultrasonic energy into a surface of the article at a first point located at a distance from the region on a first path, introducing ultrasonic energy into a surface of the article at a second point located at a distance from the region along a second path which is shorter in length than the first-named distance, said first and second points being located on the opposite sides of the region and each being positioned relative to the other and to the region to receive ultarsonic energy introduced by the other transducer, receiving at the first point reflections of the energy introduced at the first point following its traversing the distance from the first point to the region and back to the first point, receiving a the second point reflections of the energy introduced at the secod point following its traversing the distance from the second point to the region and back to the second point, the energy introduced at said first point passing through a first thickness portion of said region, and the energy introduced at said second point passing through a second thickness portion of said region, and providing an indication of reflected energy received at first and second points.

3. The method of inspecting an elongated weld in an article to detect ultrasonic reflecting anomalies in the region of said weld comprising the steps of:

introducing ultrasonic energy into the article at a first point located at the surface of the article on one side of said weld and separated therefrom by a first distance, said energy being directed along a first path from said first point toward said weld, introducing ultrasonic energy into the article at a second point located at the surface of the article on the opposite transverse side of said weld and separated therefrom by a second distance that is different from said first distance, said energy introduced at the second point being directed along a second path from the second point toward said weld, said first and second points being located on the article to receive, respectively, ultrasonic energy propagating along the second and first paths after having passed through the region of the weld, receiving at the first point ultrasonic energy introduced at the first point and which traverses said first path to the region of the weld and is reflected from an anomaly in said region and returns to the first point, receiving at the first point ultrasonic energy introduced at the second point and following its traversal through the region of the weld along said second path, providing indications in response to ultrasonic energy received at the first point, said received energy having been introduced into said article at both said first and second points.

4. The method claimed in claim 3 and including the further step of receiving at the second point ultrasonic energy introduced at the second point and which traverses the second path to the region of the weld and is reflected from an anomaly therein and returns to the second point.

5. The method claimed in claim 3 and including the further step establishing relative translation of said weld with respect to said two points while maintaining the two points at their respective distances from said weld.

6. Ultrasonic inspection apparatus for inspecting an elongated weld in an article to detect ultrasonic reflecting anomalies in the region of said weld, comprising:

a first transceiving transducer coupled at a first point to the surface of the article to direct ultrasonic energy into the region of the weld, said first transducer being spaced from the weld along a first path by a first predetermined distance, a second transducer coupled to the surface of the article at a second point to direct ultrasonic energy into the region of the weld, said second transducer being spaced from the weld on the opposite side thereof from said first transducer along a second path by a second predetermined distance different from said first distance, each transducer being positioned relative to the other transducer and relative to the weld to receive ultrasonic energy introduced by the other transducer, energizing means connected to said transducers for energizing the respective transducers, detector means coupled to said transceiving transducer for detecting ultrasonic energy received by the transceiving transducer, displaying means connected to said detector means for providing a display indicating reflected ultrasonic enery received at the transceiving transducer after being introduced at that transceiving transducer and for providing a display of ultrasonic energy received at the transceiving transducer after being introduced at the other transducer.

7. The combination claimed in claim 6 wherein said second transducer is a transceiving transducer and, said detector means is coupled to receive ultrasonic energy received by said second transceiving transducer, said displaying means also providing a display that indicates reflected ultrasonic energy received at the second transducer after being introduced at that second transducer.

8. The combination claimed in claim 6 and further including gating means coupled to said detector means and providing gate signals to cause the detector means to produce output signals only when said first transceiving transducer is expected to receive ultrasonic energy introduced at the first transceiving transducer and reflected from the region of the weld, and to produce output signals only when ultrasonic energy is expected to be received by the first transceiving transducer after being introduced at the second transducer.

9. The method of identifying the existence of an anomaly capable of reflecting ultrasonic energy within an inspected region of an article, the article having two services separated by the thickness of the article, which comprises the steps of:

introducing ultrasonic energy into a surface of the article at a first point located at a distance from the region on a first path, introducing ultrasonic energy into a surface of the article at a second point located at a distance from the region along a second path which is shorter in length than the first-named distance, said first and second points being located on the opposite sides of the region and each being positioned relative to the other and to the region to receive ultrasonic energy introduced by the other transducer, receiving at the first point reflections of the energy introduced at the first point following its traversing the distance from the first point to the region and back to the first point, receiving at the second point reflections of the energy introduced at the second point following its traversing the distance from the second point to the region and back to the second point, the energy introduced at said first point passing through a first thickness portion of said region and the energy introduced at said second point passing through a second thickness portion of said region, providing an indication of reflected energy received at said first and second points, receiving at the first point energy introduced at the second point following its traversing the distance between the points, receiving at the second point energy introduced at the first point following its traversing the distance between the points, providing an indication of energy received at said first and second points after the energy traverses the distance therebetween, the ultrasonic energy introduced at said two points being introduced firstly at said first point, secondly at said second point, and thirdly at said first and second points simultaneously, thereby sequentially indicating anomalies in said first thickness portion of said region, indicating anomalies in said second thickness portion of said region, and verifying proper introduction and receipt of energy at said first and second points.

10. The method of inspecting a given region of an article which is capable of propagating ultrasonic energy to detect ultrasonic reflecting anomalies in said region, comprising the steps of:

introducing ultrasonic energy into the surface of an article at a first point located a distance from said region along a first path, introducing ultrasonic energy into the surface of the article at a second point located at a different distance from the region along a second path, said first and second points being located to receive, respectively, ultrasonic energy propagating along the second and first paths after having passed through said region, receiving at the first point ultrasonic energy introduced at the first point and which traverses said first path to the inspected region and is reflected from an anomaly therein and returns to the first point, receiving at the first point ultrasonic energy introduced at the second point and after having passed through said region along said second path, providing indications in response to ultrasonic energy received at the first point, receiving at the second point ultrasonic energy introduced at the second point and which traverses to the inspected region and is reflected from an anomaly therein and returns to the second point, providing indications in response to ultrasonic energy returning along said second path and received at the second point, said indications of reflected ultrasonic energy received at the first and second points being presented on the same recording medium in a composite indication, and activating an indicating means that provides said indications only during respective time intervals during which a reflection of ultrasonic energy is anticipated to be received from said region along the respective paths.

11. The method of inspecting a given region of an article which is capable of propagating ultrasonic energy to detect ultrasonic reflecting anomalies in said region, comprising the steps of:

introducing ultrasonic energy into the surface of an article at a first point located a distance from said region along a first path, introducing ultrasonic energy into the surface of the article at a second point located at a different distance from the region along a second path, said first and second points being located to receive, respectively, ultrasonic energy propagating along the second and first paths after having passed, respectively, through different portions of said region, receiving at the first point ultrasonic energy introduced at the first point and which traverses said first path to the inspected region and is reflected from an anomaly therein and returns to the first point, receiving at the first point ultrasonic energy introduced at the second point and after having passed through said region along said second path, providing indications in response to ultrasonic energy received at the first point, receiving at the second point ultrasonic energy introduced at the second point and which traverses to the inspected region and is reflected from an anomaly therein and returns to the second point, and providing indications in response to ultrasonic energy returning along said second path and received at the second point.

References Cited

UNITED STATES PATENTS

| | | | |
|---|---|---|---|
| 3,050,988 | 8/1962 | Gordon et al. | 73—67.5 |
| 3,274,822 | 9/1966 | Stanya | 73—67.9 |
| 3,323,512 | 6/1967 | Clynes | 128—2 |

FOREIGN PATENTS 1,101,017  3/1961  Germany.

OTHER REFERENCES

Robinson et al. "The C.A.L. Two Channel Ultrasonic Neuroscope, Report C.A.L., No. 23, March 1964, Commonwealth Acoustic Laboratories, Sydney, Australia.

JAMES J. GILL, Primary Examiner

U.S. Cl. X.R.

73—67.8